(12) United States Patent
Nelson

(10) Patent No.: US 6,354,903 B1
(45) Date of Patent: Mar. 12, 2002

(54) METHOD OF MANUFACTURE OF A PLASMA REACTOR WITH CURVED SHAPE FOR TREATING AUTO EMISSIONS

(75) Inventor: David Emil Nelson, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/517,682

(22) Filed: Mar. 2, 2000

Related U.S. Application Data

(60) Provisional application No. 60/141,403, filed on Jun. 29, 1999.

(51) Int. Cl.[7] ............................................. F01N 3/10
(52) U.S. Cl. .................................... 445/58; 29/890
(58) Field of Search ................ 445/22, 58; 422/174, 422/177, 180; 29/890

(56) References Cited

U.S. PATENT DOCUMENTS 5,062,911 A * 11/1991 Hampton et al. ............. 156/89

* cited by examiner

*Primary Examiner*—Michael H. Day
*Assistant Examiner*—Thelma Sheree Clove
(74) *Attorney, Agent, or Firm*—Vincent A. Cichosz

(57) ABSTRACT

A method for preparing a non-thermal plasma reactor reactor characterized by multiple concentric exhaust channels and multiple concentric conductor channels having alternating polarity, each connected to its respective polarity via bus paths is provided. The method comprises forming a substrate having a curved, swept shape comprising a thick outer wall surrounding a plurality of channels separated by dielectric barriers, coating selected channels with a conductive material to form conductor channels capable of forming an electric field around uncoated exhaust channels. Masking is employed to effect selective coating of conductive material while preventing the conductive material from being applied to non-value added areas. A first mask is employed to apply conductive material forming conductor channels and bus paths. An additional mask may be employed to cover the conductor channels and bus paths with a sealant. The method minimizes manufacturing steps as compared to prior methods. For example, all of the substrate channels are coated at the same time. Further, firing cycles occur with the entire substrate rather than as multiple pieces coated and fired separately.

20 Claims, 4 Drawing Sheets

METHOD OF MANUFACTURE OF A PLASMA REACTOR WITH CURVED SHAPE FOR TREATING AUTO EMISSIONS

CROSS-REFERENCE TO RELATED APPLICATIONS

The present application claims priority to U.S. provisional application Ser. No. 60/141,403 filed Jun. 29, 1999, by David E. Nelson entitled "Design and Method of Manufacture of a Plasma Reactor With Curved Elements for Treating Auto Emissions."

TECHNICAL FIELD

This invention relates to reactors for chemical reduction of nitrogen oxide (NOx) emissions in the exhaust gases of automotive engines, particularly diesel and other engines operating with lean air fuel mixtures that produce relatively high emission of NOx. More particularly, the invention pertains to an improved method for preparing a non-thermal plasma reactor for use with diesel engines and the like.

BACKGROUND OF THE INVENTION

In recent years, non-thermal plasma generated in a packed bed reactor has been shown to be effective in reducing nitric oxides (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz.

An outside or ground electrode is formed by a coating of metal in various forms, including tape, flame spray, mesh, etc. The space between the center electrode and the inside diameter of the dielectric tube is filled or packed with small diameter glass beads. When high voltage alternating current is applied to the center electrode, the surfaces of the beads go into corona, producing a highly reactive and selective surface for inducing the desired reaction in the gas.

Unfortunately, the packed bed design with its loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A reactor for use with diesel engines and other engines operating with lean air fuel mixtures is disclosed in commonly assigned U.S. patent application Ser. No. 09/465,073 (Attorney Docket No. DP-300477) entitled "Non-thermal Plasma Exhaust NOx Reactor," which is hereby incorporated by reference herein in its entirety. Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates. Conductive ink is sandwiched between two thin nonporous alumina plates or other suitable insulating plates to prevent arcing while providing a stable electrode spacing for a uniform electric field. The electrodes are coated onto alumina in a pattern that establishes a separation between the electrodes and the connectors of alternate electrodes suitable to prevent voltage leakage.

In commonly assigned U.S. Provisional Application Serial No. 60/141,427 filed Jun. 29, 1999 (Attorney Docket No. DP-300505) entitled "Design and Method of Manufacturing a Plasma Reactor for Treating Auto Emissions—Stacked Shapes," which is hereby incorporated by reference herein in its entirety, a non-thermal plasma reactor element is prepared from a planar arrangement of formed shapes of dielectric material, which shapes are used as building blocks for forming the region of the reactor wherein plasma is generated. The formed shape defines an internal cell in the plasma reactor having an exhaust passage for flowing exhaust gas to be treated therethrough. Individual cells are provided with a conductive print disposed thereon to form electrodes and connectors. In a preferred embodiment, the conductive print comprises a continuous grid pattern having a cutout region disposed opposite the terminal connector for reducing potential voltage leaks. Multiple formed cells are stacked and connected together to form a multi-cell stack.

Commonly assigned U.S. Provisional Application Serial No. 60/141,394 (Attorney Docket No. DP-300478) entitled "Plasma Reactor Design for Treating Auto Emissions—Durable and Low Cost" which is hereby incorporated by reference herein in its entirety, an non-thermal plasma reactor element for conversion of exhaust gas constituents is prepared from an extruded monolith of dense dielectric material having substantially planar internal features. The monolith comprises a plurality of channels separated by substantially planar dielectric barriers and a perimeter boundary wall. Conductive material printed onto selected channels forms conductive channels that are connected along bus paths to form an alternating sequence of polarity, separated by exhaust channels. Conductive channels and channels not selected for exhaust flow are plugged at end portions of the monolith with a material suitable for excluding exhaust gases and for preventing electrical leakage between conductive channels. During operation, exhaust gas flows through exhaust channels and is treated by high voltage alternating current flowing through the conductive channels. The substantially planar internal monolith features provide a uniform electrical response throughout the exhaust channels.

While the above non-thermal plasma reactors meet some of the current needs and objectives, there remains a need in the art for an improved, method for preparing such a reactor.

SUMMARY OF THE INVENTION

A method for preparing a non-thermal plasma reactor comprises forming a curved, swept-shaped substrate specifically designed for fabrication via extrusion and preparing a reactor element from the formed substrate. The method comprises forming the substrate, selectively coating the substrate, and firing and drying, as needed. The as-extruded curved substrate comprises a thick outer wall surrounding a plurality of channels separated by dielectric barriers. The curved substrate is formed from materials having a high dielectric constant such as, but not limited to, dense cordierite, alumina, titania, mullite, plastic, among others, or combinations thereof.

Selected channels are coated with conductive material to form conductor channels capable of forming an electric field around exhaust channels. Preferably, masking is employed to effect selective coating of the conductive material while preventing the conductive material from being applied to non-value added areas. A first mask is employed to apply conductive material forming conductor channels and bus paths. An additional mask may be employed to cover the conductor channels and bus paths with a sealant.

The prepared reactor element preferably comprises multiple concentric exhaust channels, multiple concentric conductor channels having alternating polarity, each connected to its respective polarity via bus paths, in-line structural support ligaments for providing optimal structural support while preventing exhaust leakage, and thick outer walls providing high crush resistance and allowing robust mounting into the reactor housing. The nested, concentric arrangement and curved shape substrate advantageously enhances the reactor's ability to fit into vehicles. High durability is afforded by the thick outer walls, and in a preferred embodiment, the inclusion of integral structural support ligaments. The improved wall thickness achieved over prior ceramic plate designs provides the advantage of a more uniform electrical response. Improved resistance to voltage leakage is achieved by containing the channel conductors within dielectric channels (except at ends) and providing a dielectric coating at each end to prevent voltage leaks there.

The present method affords the advantage of minimizing manufacturing steps as compared to prior methods. For example, all of the substrate channels are coated at the same time. Further, firing cycles occur with the entire substrate rather than as multiple pieces coated and fired separately.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures:

FIG. 3 is a view of the embodiment shown in FIG. 1 with the mask on.

DESCRIPTION OF THE PREFERRED EMBODIMENT

Figure 1:
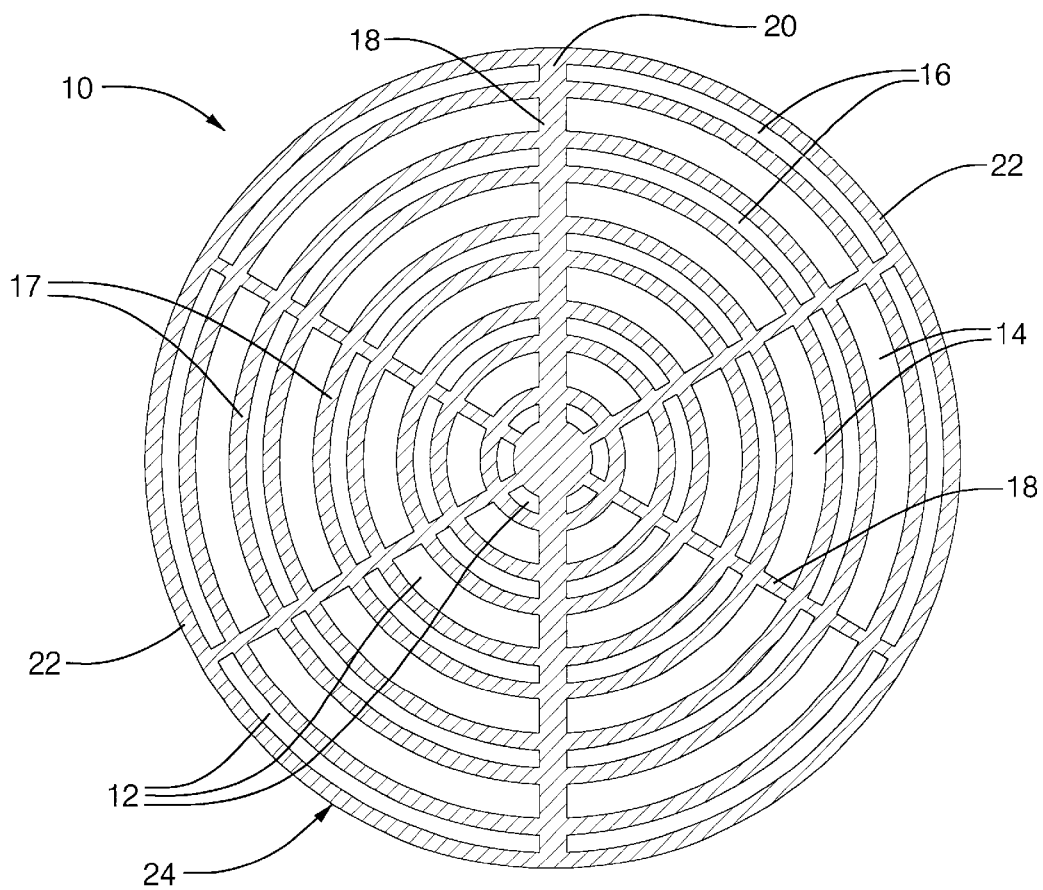
FIG. 1 is a cross-sectional view of the face of an uncoated as extruded curved substrate in accordance with an embodiment of the present invention.

FIG. 1 shows a cross-section of an extruded round substrate 10 formed in accordance with the present method. The extruded reactor substrate 10 for preparing the region of the reactor where the plasma is generated comprises concentric curved channels 12. The concentric curved channels 12 are processed to form alternating relatively thick exhaust channel passages 14 and relatively thin conductor channels 16 (i.e., the dimensions of the exhaust channel passages 14 are thick relative to the dimensions of the conductor channels 16). A tightly controlled dielectric barrier thickness layer 17 separates the alternating thick exhaust channel passages 14 and thin conductor channels 16. The curved, swept shape provides considerable flexibility to accommodate various vehicle packaging requirements.

Any suitable dielectric substrate material may be employed for forming the curved substrate 10 including, but not limited to, alumina, dense cordierite, mullite, titania, plastic, and other high dielectric constant materials, or a combination thereof.

A preferred embodiment comprises integrally forming structural support ligaments 18 as part of the extruded curved substrate 10 to enhance substrate 10 integrity. One or more structural support ligaments 18 may further serve as a substrate for conductive bus paths 20. Preferably, a minimal number of structural support ligaments 18 are employed so as to minimize flow loss. Structural ligaments 18 are coated with conductive medium during formation of the conductor channels 16 and the structural ligaments 18 thus coated serve to ensure robust electrical connections to each conductor channel 16 wall.

Thick outer wall 22 surrounds the curved substrate 10 providing mechanical strength to the prepared reactor element and an insulating barrier against voltage leakage. In a preferred embodiment, thick outer wall 22 has a thickness of about 1 millimeter to about 5 millimeters. In another preferred embodiment, thick outer wall 22 has a rough outer surface that increases the ability of the housing mounting system to grip the substrate outer wall 22 and enables the substrate 10 to resist telescoping relative to the reactor housing during use.

Preferably, the face of the coated substrate 10 is provided with an insulating sealant (a peripheral portion of which is indicated by numeral 24) to protect the bus paths 20 and inhibit voltage leaks. The insulating sealant 24 may be any suitable sealant material known in the art, including, but not limited to, glass frit, ceramic-based coatings, encapsulents, or combinations thereof. For example, a glass frit and binder may be used to plug the conductor channels 16 after coating. Alternately, a seal may be glued to the substrate 10, such as an alumina cover plate with cutouts.

Dimensions for the various channels 12 are selected in accordance with performance and design criteria and selection of dielectric material. For example, dimensions for the dielectric barrier thickness layer 17 are selected in accordance with the particular dielectric material used, the dimensions of the relatively thick exhaust channel passages 14 and the relatively thin conductor channels 16, the spacing of the structural ligaments 18, if any, the total number of cells, the width of the electrical bus paths 20, and the thickness of the outer wall 22.

Figure 2:
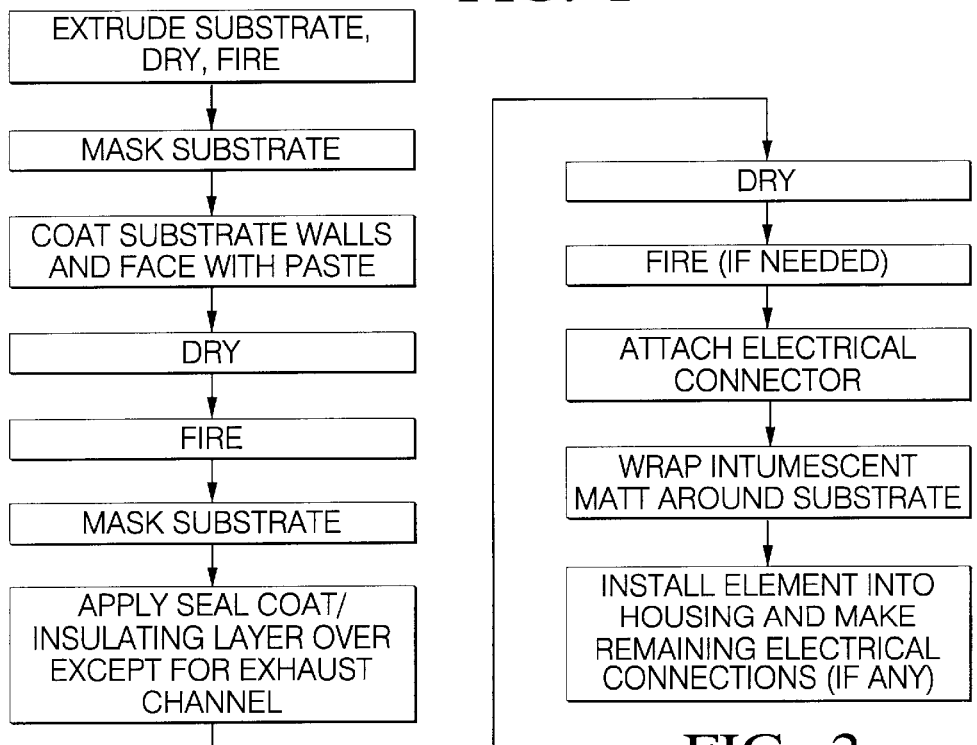
FIG. 2 is a process flow diagram of the method of manufacturing a plasma reactor in accordance with the present invention.

FIG. 2 provides a process flow diagram for preparing the present non-thermal plasma reactor. Additional detail regarding the present non-thermal plasma reactor design is provided in commonly assigned, provisional; application Serial No. 60/141,401 (Attorney Docket Number DP-300479), filed Jun. 29, 1999, by David E. Nelson, entitled "Method of Manufacturing A Plasma Reactor For Treating Auto Emissions—Durable and Low Cost," which is hereby incorporated by reference herein in its entirety.

Generally, the process comprises extruding a curved substrate 10, supplying a mask 26 to the substrate 10, coating the masked substrate with conductive material, drying, and firing, as needed, to form the conductor channels 16. Masking may be repeated for applying a sealing coat (not shown) to cover the thin conductor channels 16 and bus paths 20, drying, and firing (if needed). Electrical connections (not shown) are made by attaching terminations to the bus paths 20 with insulating connects, wrapping an insulator, such as an intumescent matt, around the substrate 10, inserting shielded wire through the reactor housing, and installing the substrate 10 into a housing (housing not shown). The method may comprise disposing a support between the substrate 10 and the reactor housing.

Figure 3:
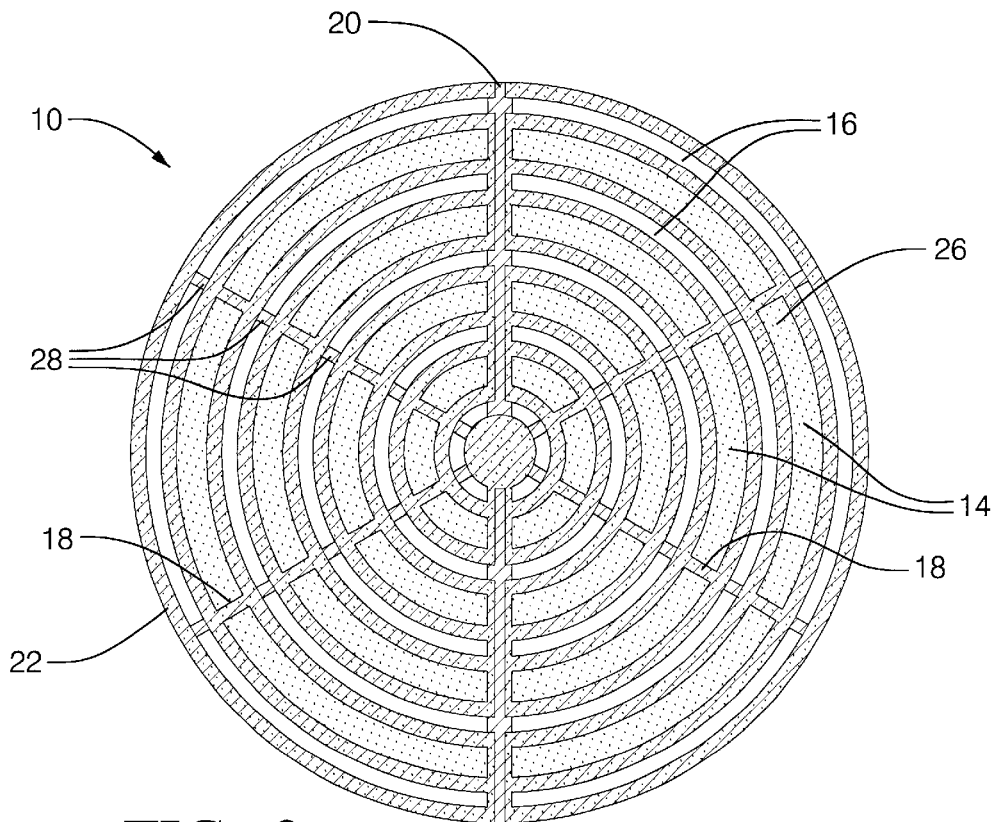

FIG. 3 provides a view of the substrate 10 after the mask 26, typically comprising an emulsion on a screen, is registered against the face of the substrate 10. While a mask 26 is used to focus the conductive media where desired, a thixotropic conductive medium may be used to enhance placement of the medium. Ultrasonic vibration and gravity may be employed to coat one wall of the conductor channels 16 and the substrate 10 may then be flipped to coat the opposite wall. Typically, coating comprises dispersing conductive material within selected channels and applying a vacuum to remove excess conductive material. This approach effectively coats all interior walls of the conductor channels 16.

Drying and firing steps are preferably employed to remove solvents and allow the conductive material to become firmly affixed to the conductor channel walls 16. Typically, drying comprises drying the coated substrate 10 in an oven at about 100° C. to about 175° C. for about 5 to about 100 minutes. Firing is preferably accomplished in an exhausted firing furnace capable of bringing the coated substrate up to a temperature of about 175° C. to about 850° C. for about 15 to about 45 minutes.

Conductive media used to form the conductor channels 16 may comprise any conductive media providing the desired durability, temperature capability, and cost parameters. Typically, the conductive media will perform at temperatures up to about 600° C. Suitable conductive media include, but are not limited to, silver inks, aluminum inks, and copper inks, among others, with water-based silver inks preferred.

Masking may be repeated to apply a sealant to the substrate 10. The mask design as shown in FIG. 3 for applying the conductive material may be used for the sealant. Preferably, an insulating sealant is provided to protect the bus paths 20 and to minimize voltage leaks. The insulating sealant 24 may be any suitable sealant material known in the art, including, but not limited to, glass frit, ceramic-based coatings, encapsulents, or combinations thereof. For example, a glass frit and binder may be used to plug the conductive channels 16 after coating. Alternately, a seal may be glued to the substrate 10, such as an alumina cover plate with cutouts.

In applying the sealing coat, the sealant material is relatively viscous and will fill channels and coat over the fired channel conductors 16 on the face of the substrate 10. Sealing of the conductor channels 16 eliminates exhaust blow by and further prevents voltage leakage. Optionally, wire may be connected to the bus paths 20 at a desired substrate 10 face location prior to sealing. In this embodiment, the sealant, which has electrical insulating properties, provides insulating coverage over the bus paths 20. Alternatively, the sealant may be applied using a stencil and squeegee, a brush, or other suitable sealant coating method.

Drying of the sealant may be air or oven drying. Typically, drying comprises drying the sealant in an exhausted drying oven at a temperature of about 75° C. to about 150° C. for about 5 to about 45 minutes.

Firing may be desirable for certain sealant compositions. For example, a sealant comprising glass frit is often fired to allow the glass to achieve an extremely robust bond with the underlying layers. Temperature and time parameters are selected empirically based upon the sealant composition. Typically, firing comprises heating the sealant-coated substrate to a temperature of about 400° C. to about 900° C. for about 10 to about 30 minutes.

Figures 7, 8:
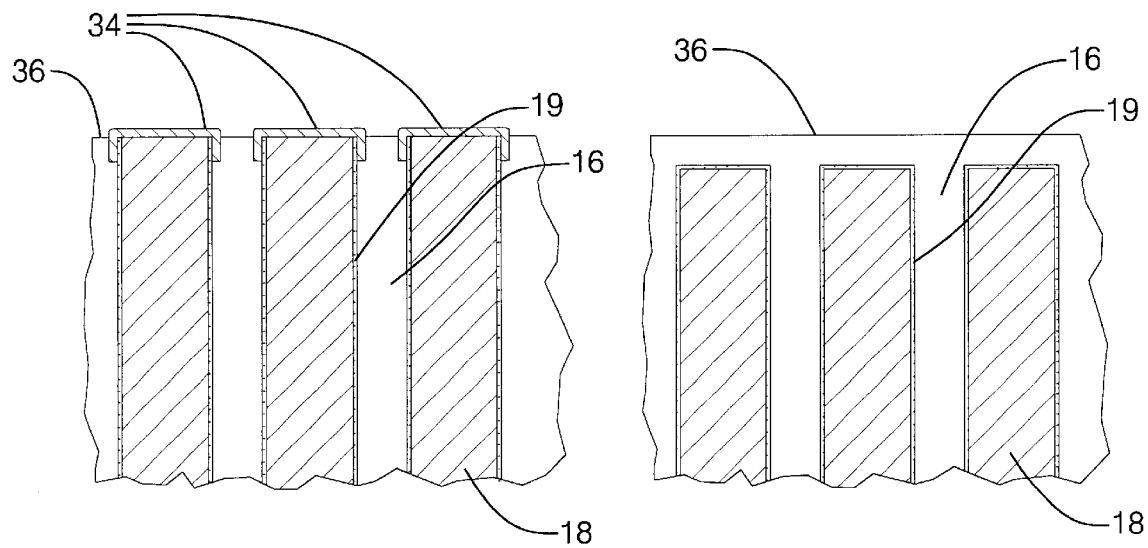
FIG. 7 is a view showing electrical connection between adjacent conductor channels along paths in an embodiment wherein structural ligaments are left unmodified.
FIG. 8 is a view showing electrical connection between adjacent conductor channels along paths in an embodiment wherein structural ligaments are partially removed.

In an alternate embodiment designed to enhance robust electrical connections across structural support ligaments 18, the structural support ligaments 18 are partially removed from conductor channels 16 prior to coating (indicated by numeral 28 in FIG. 3). For example, an approximately 10 millimeter section of the structural support ligaments 18 may be removed in order to establish continuous conductive paths along the conductor channels 16. FIG. 8 shows a view of the electrical connection between adjacent conductor channels 16 having structural support ligaments 18 partially removed (i.e., ligaments 18 are set back from the substrate 10 face 36).

In another embodiment, electrical connections are provided by disposing conductive coating on the face ends of the structural ligaments 18 in the conductor channels 16. FIG. 7 provides a view of the electrical connection 34 between conductor channels 16 via conductive material connecting over the substrate face end 36 to both sides of the conductor channels 16. In yet another embodiment, the structural ligaments 18 are lined up between the conductor channels 16 and the exhaust channels 14 to ensure that there are no uncoated areas in the conductor channels 16.

Conductive medium that may deposit on the back face (not shown) of the substrate 10 is removed. For example, the substrate 10 may be cut with a dicing saw after firing to remove a portion of the substrate end.

Figure 4:
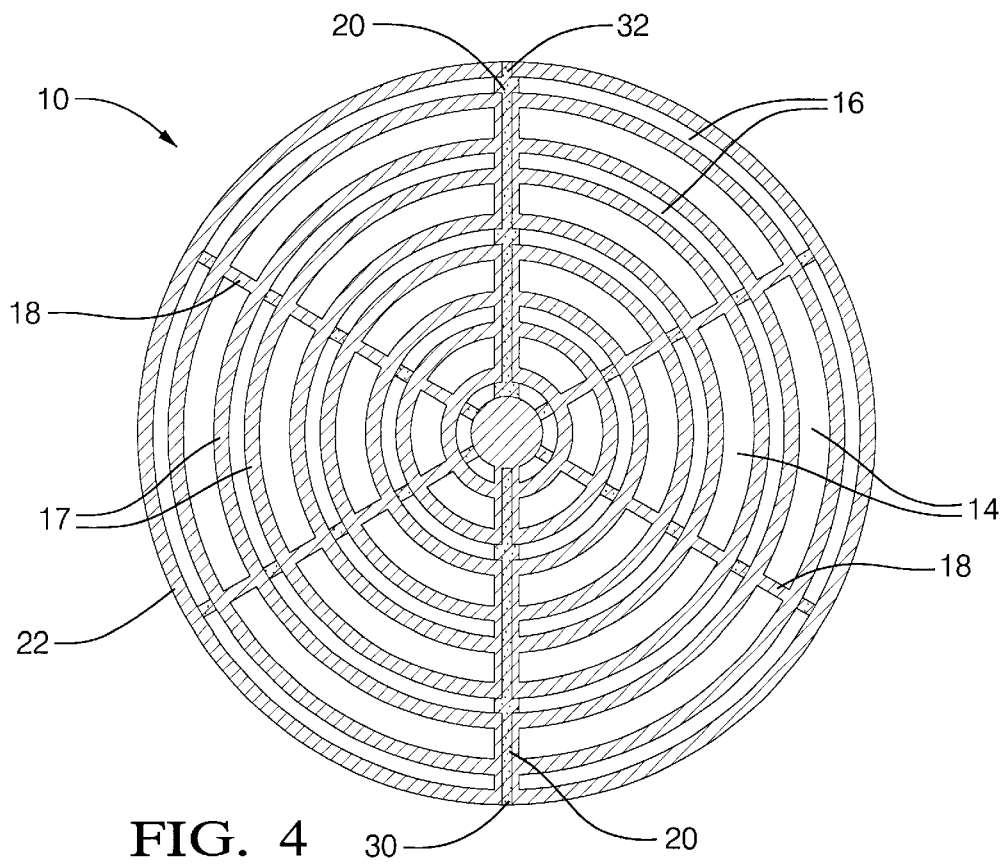
FIG. 4 is a view of the embodiment shown in FIG. 1 with the conductive media applied thereto.

FIG. 4 shows a view of the substrate 10 after the mask 26 (shown in FIG. 3) has been removed and the substrate 10 has been dried and fired. The conductive layer coats the walls of the thin channels (now conductor channels 16) and connects to positive and negative bus paths 20 that lead to positive and negative terminals 30, 32, ultimately connecting to a power supply (not shown).

Assembly comprises providing electrical connections and inserting the reactor into a reactor housing. Attaching terminations typically comprises connecting wires to filled holes connecting the outside of the substrate 10 to the bus paths 20. In an alternate embodiment, wiring may be connected prior to applying the sealant. An intumescent matt may be wrapped about the substrate 10 with wiring are allowed to pass through the matt. Typically, the reactor housing is welded or crimped to secure. If used, fittings may be welded or otherwise secured to the housing.

Figure 5:
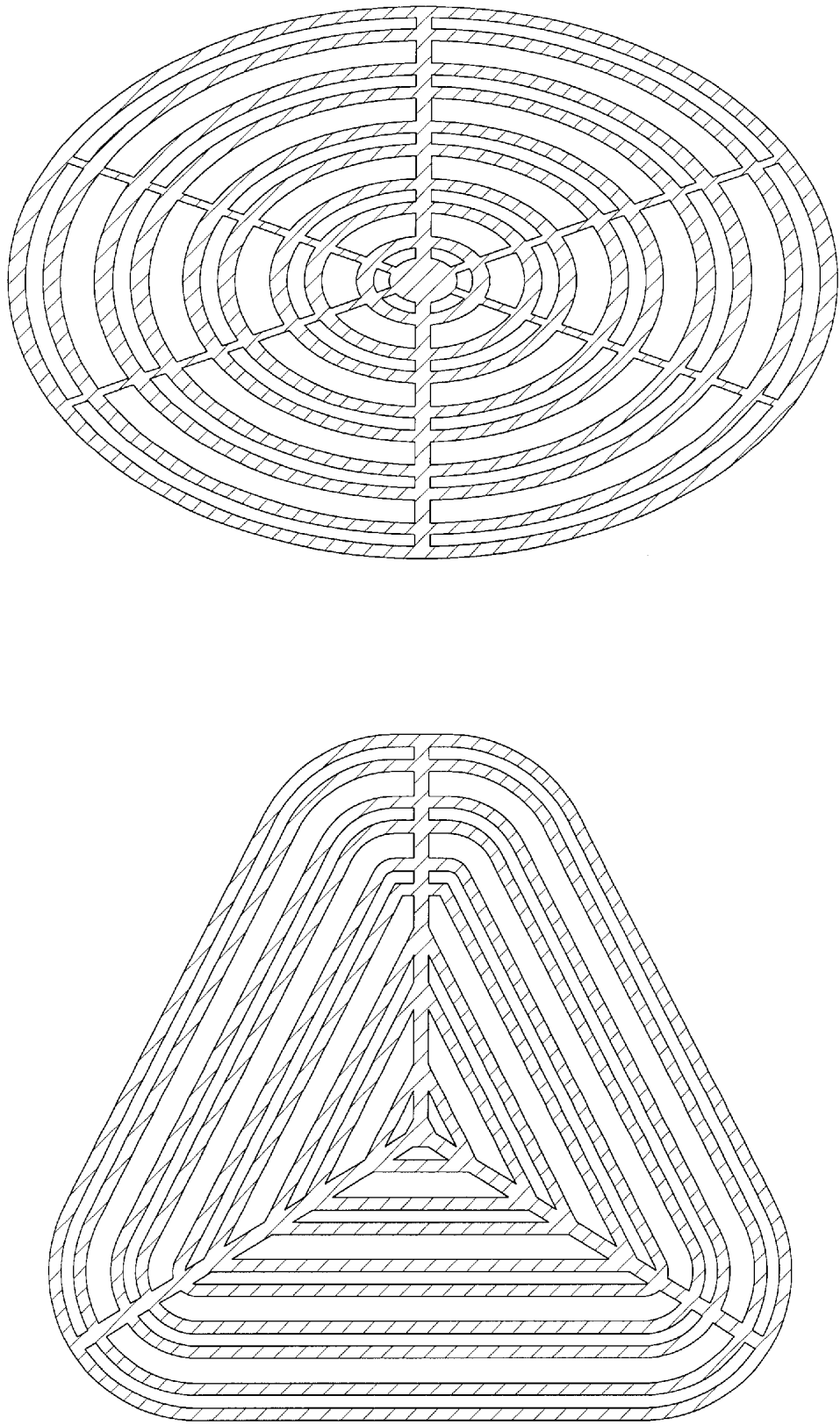
FIG. 5 is a view of two alternate embodiments for the curved substrate shape in accordance with the present invention.

The embodiment of FIG. 1 shows a substrate 10 having a round shape. The present invention encompasses curved and swept shapes generally, and numerous shape variations are considered within the scope of the present invention. FIG. 5 provides a view of two alternate embodiments for substrate 10 shapes suitable for the present non-thermal plasma reactor. Alternate shaped embodiments include, but are not limited to, round, oval, racetrack, and trapezoid shapes.

The space velocity of gas passing through a plasma reactor can be very high, with levels that may exceed 1 million inverse hours. The present invention achieves a low backpressure while taking advantage of the capability for a very high gas space velocity by providing a shape comprising a large frontal area and a short length (relative to the frontal area). In a preferred embodiment, the substrate 10 comprises a frontal area that is sufficiently large to achieve a low backpressure while the reactor length is adjusted to achieve the desired gas space velocity in accordance with the particular engine emission system.

Figure 6:
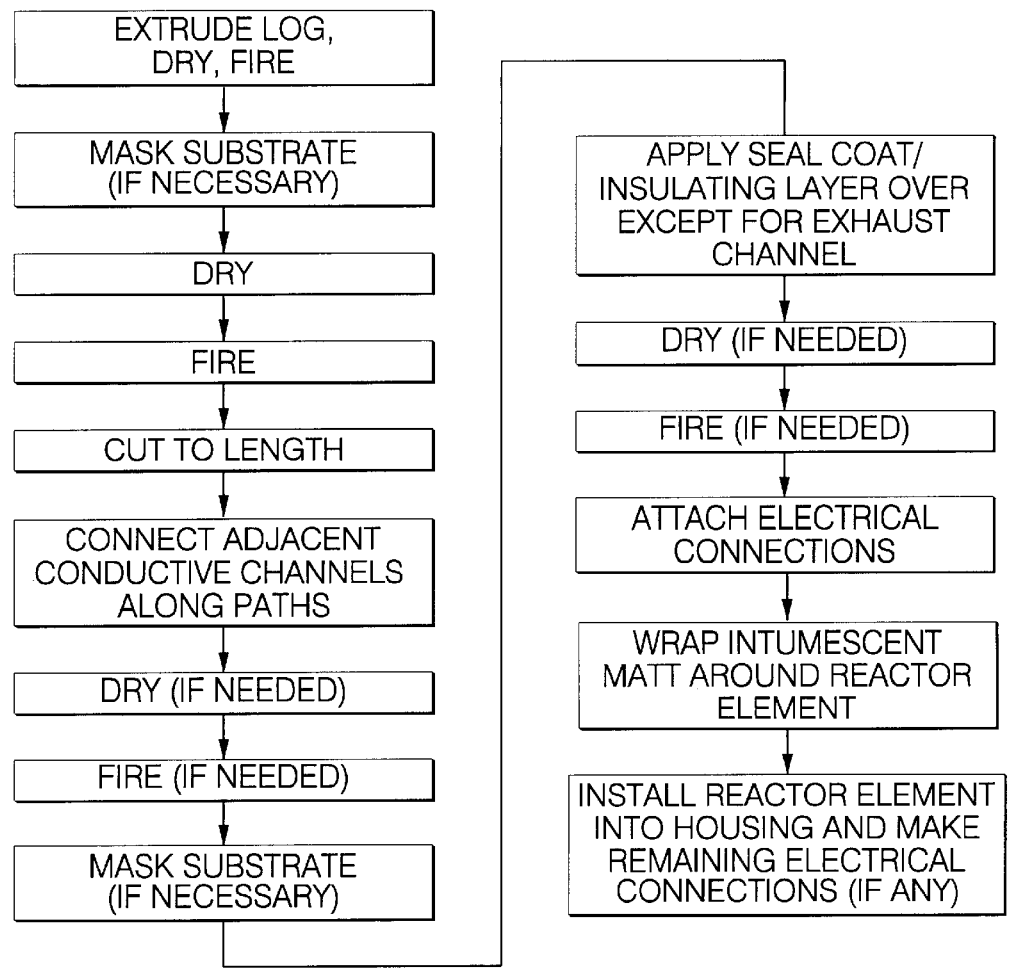
FIG. 6 is a process flow diagram of an alternate embodiment in accordance with the present method employing extruded logs.

FIG. 6 provides a process flow diagram of an alternate embodiment of the present method comprising preparing relatively long extruded logs into reactor elements. For example, the method comprises preparing logs that are two or more times as long as required for a single reactor element, typically about two to about fifty times as long as a single reactor element. The logs have the same internal features as provided in the embodiments described above. This embodiment provides a manufacturing flow that reduces the number of times that conductive coatings must be applied as well as improving ability to consistently confine conductive material to the conductor channels during manufacturing.

Referring to FIG. 6, the process comprises preparing the relatively long extruded logs via a one-step process, such as extruding with an extrusion press, drying to remove volatile components and to strengthen the log and firing, as needed. While log lengths are typically about two to about fifty times the desired length of the final prepared reactor element, the length of the log is limited only by the capability of the extrusion press. Further, the length can be fine-tuned to provide minimal loss based upon a specific reactor length requirement. Preferably, the extruded log is supported during drying to maintain shape. Firing is preferably firing over one to several days to form a structure that has full strength.

Selectively coating to form conductor channels is accomplished by temporarily plugging one end of the log so as to cover at least the end of the channels that are to be coated, dispensing conductive ink from the end opposite the plugged end to nearly fill the channels that are to be coated. Preferably, dispensing is with a pressurized dispensing system having multiple delivery tubes to feed conductive ink material from a mixing container through the delivery tubes and into each conductive channel. The temporary plug is removed from the other end and the excess conductive material is removed. Typically, a vacuum is applied to remove the bulk of the conductive ink—leaving a minimal coating on interior walls of the conductor channels.

Alternatively, the ink dispensing system may be also be used to withdraw the bulk conductive material. The ink delivery system seals against the face of the fired log after the channels have been nearly filled. After sealing a vacuum is applied with turning of the substrate, typically turning about 180 degrees so that gravity and vacuum pressure pull the low viscosity conductive ink out of the conductor channels and into the mixing chamber for reuse. In this way, a thin continuous coating on the interior walls of conductive channels is achieved.

Drying of the conductor channels may be by blowing heated air through all the channels within a drying oven. Typically, the air is heated from about 100° C. to about 175° C. Drying time selected according to the length of the log, ranging from about 10 minutes to about 1 day.

Firing to fuse the conductive material into intimate contact against the interior walls of the conductor channels is typically by blowing heated air through all the channels within a furnace. Peak firing temperatures are about 600° C. or above, depending upon the specific properties of the conductive ink utilized. As with drying, firing time is selected according to the log length, ranging from about 1 hour to about 3 days for the complete thermal cycle.

The fired, coated logs are now ready to be cut to desired length, using for example, a saw using diamonds or other known hard cutting surfaces. Cutting can be eliminated, of course, if the log length happens to be the desired length of the reactor element. Cutting optionally comprises making a preparatory cut at the top or bottom end of the log to assure that all conductive channels are isolated and to form a reliable datum surface for measuring the first location to be cut. Subsequent cut locations are measured relative to a new datum surface on the log end formed each time the log is cut.

The substrate is electrically connected along contiguous conductor channels and along bus paths. Turning to FIG. 7, one approach is shown for connecting contiguous conductor channels 16 comprising applying a braze wire or ribbon along the conductor channels 16 and bus paths 20. Typically, a fluxing agent doubles as a temporary adhesive to hold the braze wire or ribbon in place. Heating of the substrate 10 with braze wire or ribbon is typically at temperatures of about 600° C. or above. The braze wire or ribbon droops upon heating into the conductor channels 16, increasing the contact area of the braze wire or ribbon on each side of structural ligaments 18. The braze wire or ribbon subsequently melts in the middle region of the conductor channels 16, causing the remaining wire or ribbon length to fall back against the conductor channel walls. The braze material fuses to conductive coating material 19 and structural monolithic dielectric forming a conductive path 34 between the conductive coating 19 in a channel 16, over a structural ligament 18, and to an adjacent conductor channel 16.

Alternatively, braze wire or ribbon may be individually placed over a structural ligament 18 along a conductor channel 16 path to form the electrical connection 34 between adjacent conductor channels 16. Connecting comprising forming the braze material into a c-clip, which clips over the structural ligament 18. Upon heating, typically to about 600° C. or above, the c-clip deforms and melts, forming a conductive path between the conductive coating 19 in a channel 16, over a structural ligament18, and to an adjacent conductor channel 16. The c-clip may be formed in-situ by placing the ribbon or wire onto a ligament 18 and forming the c-clip using a U-shaped tool. Alternatively, the method may comprise inserting a pre-formed c-clip onto a structural ligament 18 between conductor channels.

Another approach for providing electrical connection between adjacent conductor channels is shown in FIG. 8. This is accomplished by masking the reactor face 36 with a stencil or screen and applying (such as by spraying or printing) a conductive coating 19 to coat the ends of ligaments 18 between contiguous conductor channels 16 and along bus paths 20 forming two electrical grids, power (termed "+") and ground (termed "−"). Substrates 10 that have conductive jumpers applied by spraying or printing are usually dried and fired. Typically, drying time is about 10 minutes at about 125° C. to about 175° C. and firing time is about 2 to about 4 hours at a temperature of about 600° C. or above.

With electrical connections made to the coated substrate, the method further comprises applying an insulating layer, such as a highly resistive ceramic coating over each end face (only one face end 36 shown) of the substrate, except for exhaust channels 14. This may comprise masking the exhaust channels 14 and depositing insulating coating using screen-printing, plasma deposition, or any known method to deposit the coating over the face 36. The insulating coating layer serves to provide electrical insulation as well as to inhibit flow through all channels except for exhaust channels 14. A pre-cursor glass or other insulating material support screen may be used as an aid to inhibit drop-through of the coating during application and before the coating achieves full strength. End terminal connections from the bus paths are not coated.

The method further comprises assembling the substrate (now the formed reactor element) into a housing, typically a metallic housing. Assembling comprises wrapping a matt, such as a highly resistive intumescent type matt, around the reactor element, providing electrical connections leading to the interior of the housing and through the housing by soldering, crimp connections, adhesive, welding, compression, or any other known electrical connection method, and inserting the wrapped element into the reactor housing.

The present method provides the advantage of reduced components compared to previous designs such as stacked plate designs. The method further provides robust coating of the substrate surface to provide excellent repeatability of electrical performance thus achieving a stable plasma. Wire connections can be made directly to the bus path and do not require expensive connections to multiple cells. The curved, swept shapes provide design flexibility and allow the reactor to be adapted for varying vehicle requirements.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method for preparing a non-thermal plasma reactor comprising:

forming a substrate having a curved, swept shape comprising a thick outer wall surrounding a plurality of channels separated by dielectric barriers;

coating selected channels with a conductive material to form conductor channels capable of forming an electric field around exhaust channels;

wherein said reactor is characterized by multiple concentric exhaust channels and multiple concentric conductor channels having alternating polarity, each connected to its respective polarity via bus paths.

2. The method of claim 1, further comprising:

employing a mask to effect selective coating of the conductive material.

3. The method of claim 1, wherein said forming comprises extruding.

4. The method of claim 1, wherein said substrate further comprises at least one integrally formed structural support ligament.

5. The method of claim 4, wherein one or more structural support ligaments serve as a substrate for conductive bus paths.

6. The method of claim 4, further comprising:

removing a portion of said structural support ligaments from said conductor channels prior to coating.

7. The method of claim 1, wherein said thick outer wall comprises a rough outer surface for attaching a reactor housing mounting system.

8. The method of claim 1, further comprising:

selectively disposing an insulating sealant on said coated substrate to protect the bus paths and inhibit voltage leaks.

9. The method of claim 8, further comprising:

employing a mask to effect selective application of said sealant.

10. The method of claim 1, further comprising:

applying a first mask to said substrate;

applying a conductive coating to said masked substrate;

allowing said conductive coating to dry;

firing said coated substrate;

removing said first mask;

applying a second mask to said substrate;

applying a barrier coating to said masked substrate;

allowing said barrier coating to dry; and firing said barrier coated substrate.

11. The method of claim 1, further comprising:

providing electrical connections; and inserting said element into a housing.

12. The method of claim 11, wherein said electrical connections are made directly to said bus paths.

13. The method of claim 11, wherein said providing electrical connections is by disposing conductive coating on at least one face end of structural ligaments in said conductor channels.

14. The method of claim 11, wherein said providing electrical connections is by placing an electrically connecting material over adjacent conductor channels to electrically connect said channels.

15. The method of claim 14, wherein said electrically connecting material is selected from the group consisting of a braze wire, ribbon, or preformed c-clip.

16. The method of claim 1, wherein said forming comprises forming a substrate having a frontal area and length tailored to achieve desired gas space velocity in accordance with particular engine emissions.

17. The method of claim 1, wherein said forming comprises forming a substrate having a frontal area that is sufficiently large to achieve a low backpressure and a length selected to achieve a desired gas space velocity in accordance with particular engine emission systems.

18. The method of claim 1, further comprising:

disposing a support between said substrate and a reactor housing.

19. The method of claim 1, wherein said forming a substrate comprises forming a log that is longer than required for a single reactor element and further comprising:

cutting said log into desired lengths.

20. The method of claim 1, wherein said forming a substrate comprises forming a log about two to about fifty times as long as required for a single reactor element and further comprising:

cutting said log into desired lengths.

* * * * *